May 20, 1941.  W. F. HESS  2,242,824
AUTOMATIC CHAIN MACHINE
Filed Oct. 28, 1939  6 Sheets-Sheet 1

INVENTOR
William F. Hess
BY
Nathaniel Frucht
ATTORNEY

May 20, 1941.   W. F. HESS   2,242,824
AUTOMATIC CHAIN MACHINE
Filed Oct. 28, 1939   6 Sheets-Sheet 2

INVENTOR
William F. Hess
BY Nathaniel Frucht
ATTORNEY

May 20, 1941.  W. F. HESS  2,242,824
AUTOMATIC CHAIN MACHINE
Filed Oct. 28, 1939  6 Sheets-Sheet 3

INVENTOR
William F. Hess
BY Nathaniel Frucht
ATTORNEY

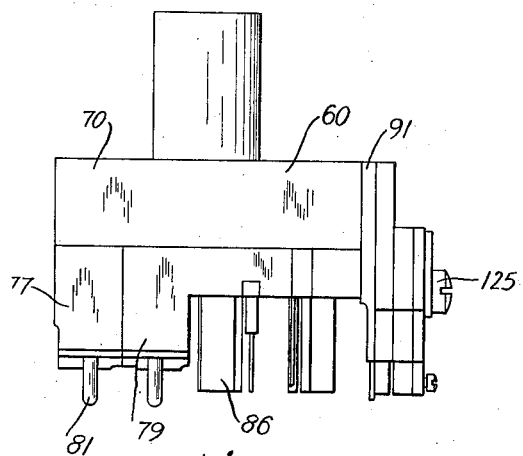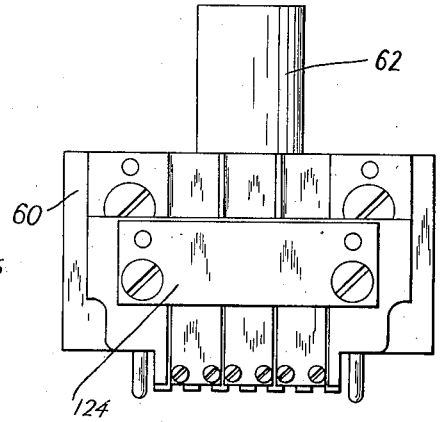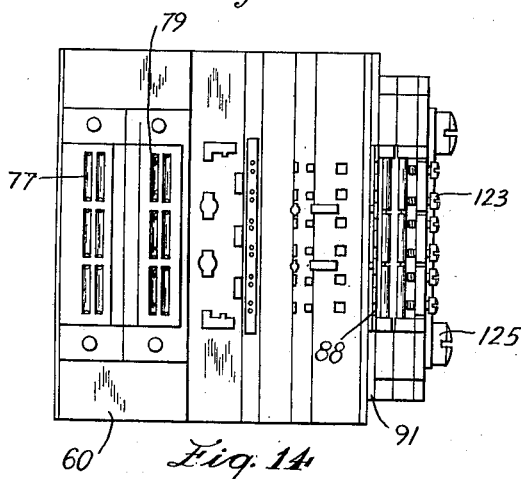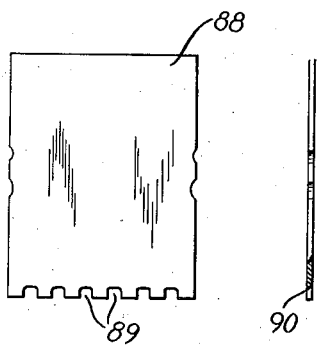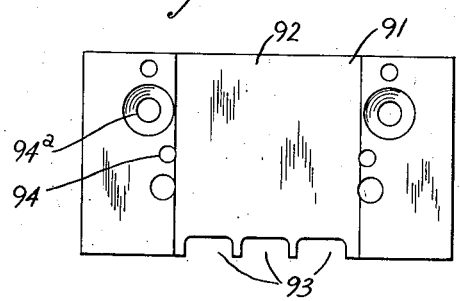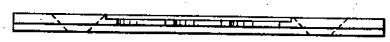

May 20, 1941.   W. F. HESS   2,242,824
AUTOMATIC CHAIN MACHINE
Filed Oct. 28, 1939   6 Sheets-Sheet 5

INVENTOR
William F. Hess
BY Nathaniel Frucht
ATTORNEY

May 20, 1941.  W. F. HESS  2,242,824
AUTOMATIC CHAIN MACHINE
Filed Oct. 28, 1939  6 Sheets-Sheet 6
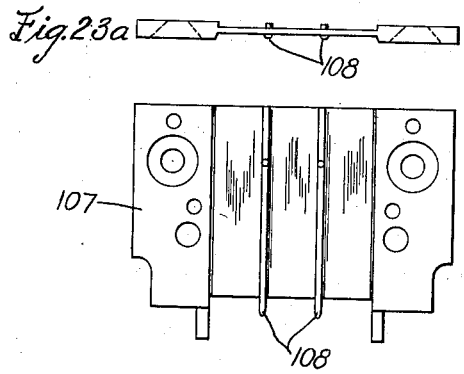
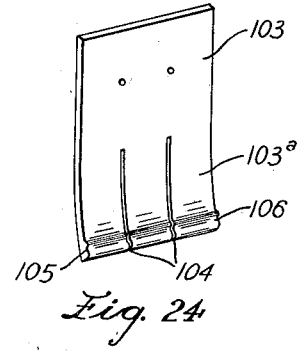
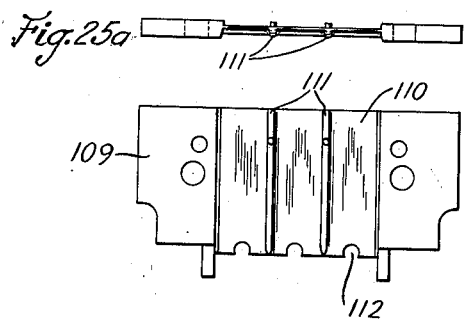
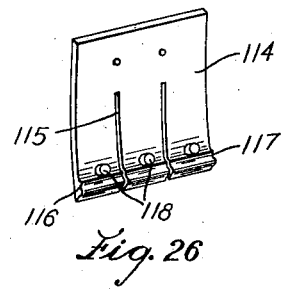
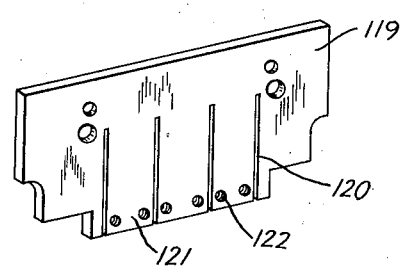
INVENTOR
William F. Hess
BY Nathaniel Frucht
ATTORNEY Patented May 20, 1941

2,242,824

UNITED STATES PATENT OFFICE 2,242,824

AUTOMATIC CHAIN MACHINE

William F. Hess, Pawtucket, R. I., assignor to Armbrust Chain Company, a corporation of Rhode Island Application October 28, 1939, Serial No. 301,711

9 Claims. (Cl. 59—15)

My present invention relates to the manufacture of jewelry, and has particular reference to a novel chain die for the manufacture of ornamental chains.

It is the principal object of my invention to provide a chain die construction for making an ornamental flexible metal chain from a continuous blank.

Another object of my invention is to provide a chain die which is simple and compact in construction and which forms the complete chain assembly by means of a stamping operation.

A further object of my invention is to provide a die which makes a very strong ornamental chain capable of resisting separation and pulling apart of the links by ordinary pull stresses.

Still another object of my invention is to provide a chain die which can be readily varied to form different types of metallic chain with different ornamentations.

With the above and other objects and advantageous features in view, my invention consists of a novel arrangement of parts more fully disclosed in the detailed description following, in conjunction with the accompanying drawings, and more specifically defined in the appended claims.

In the drawings:

Fig. 12 is a side elevation of the upper portion of the die;

Fig. 13 is a front elevation of the upper portion of the die;

Fig. 14 is a bottom plan view of the upper portion of the die;

Figs. 15 and 15a are respectively plan and edge views of the cutting blade;

Fig. 16 shows a front elevation and Fig. 16a a top plan view of the cutting blade holder;

Figure 20:
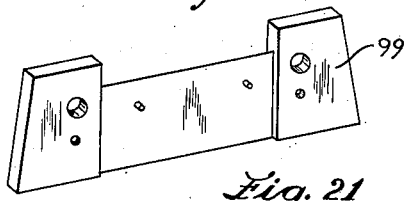
Figure 19:
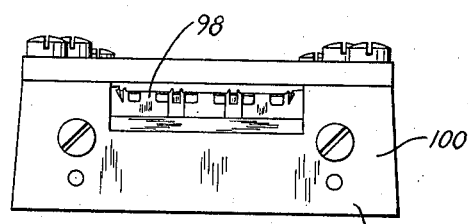
Fig. 19 is a front elevation of the lower portion of the die.
Figure 22:
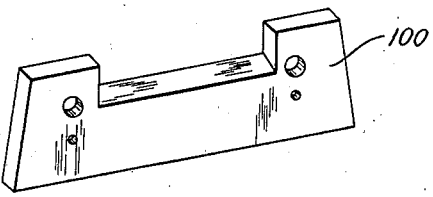

Figs. 20, 21 and 22 are respectively perspective views of the parts forming the lower portion of the die; and Figs. 23 to 27 inclusive are detail views showing the parts for the upper portion of the die, Figs. 23a and 25a being edge views respectively of the parts shown in Figs. 23 and 25.

Jewelry chains such as are used for bracelet bands, belts, and the like comprise ornamental links which are usually connected by separate joining means in order to obtain desirable flexibility and relative movement. An excessive pulling pressure exerted on the chain end may, however, pull the joining means apart so as to disconnect the ornamental links. I have found it desirable to form ornamental links so that they may be hingedly joined together without the use of separate joining means, and so that they resist the separating tendency of pulling pressures exerted on the chain ends. This type of chain is shown in my copending application, Serial No. 247,852, entitled Ornamental chain construction, filed December 27, 1938, since issued as Patent #2,170,073, August 22, 1939.

The manufacture of this type of chain in a continuous simple operation is accomplished by means of a novel compact die construction which has continuous feed of a suitable metallic blank which forms a continuous length of flexible chain therefrom of the type shown in my copending application.

Figure 1:
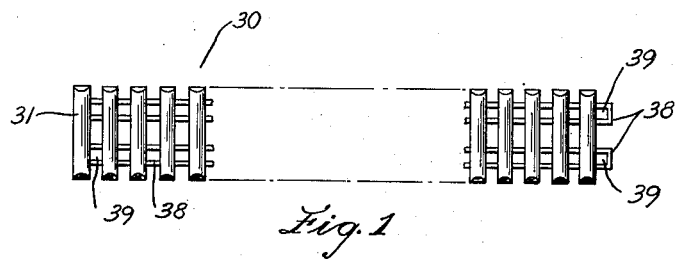
Fig. 1 is a plan view of an ornamental chain made by the die of the present invention.
Figure 2:
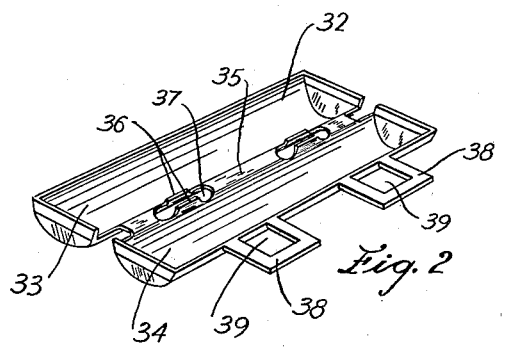
Fig. 2 is an enlarged perspective view of one of the links of the chain shown in Fig. 1, in open position.

The die of the present invention is formed so that it can be easily altered without rebuilding, to provide different types of chain construction and different variations in design. For example, referring to the drawings, the ornamental chain 30 is illustrated as formed of a plurality of separate ornamental links 31. These links are each made of metal stampings 32, see Fig. 2, each stamping having two link sections 33 and 34 which are preferably of semi-cylindrical form and are joined by a flat connector bar 35 which has spaced upstanding finger lugs 36 positioned between openings 37, it being found preferable to provide at least two sets of finger lugs and openings for an elongated link construction such as shown in Fig. 1. The finger lugs extend back as illustrated, and are an integral part of the stock of the link sections. Each link section 34, see Fig. 2, has edge hinge tabs 38 extending horizontally therefrom and provided with openings 39, the tabs and openings corresponding to and being aligned with the spaced finger lugs.

Figures 3, 5:
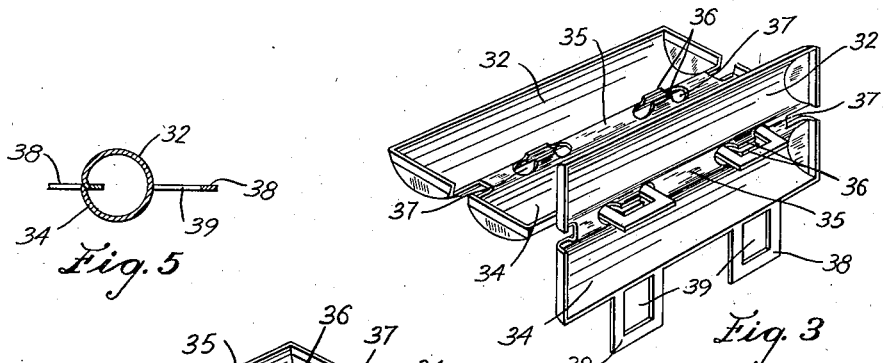
Fig. 3 is an enlarged perspective view of two links of the chain shown in Fig. 1 in partially assembled position.
Fig. 5 is a section on the line 5—5 of Fig. 4.
Figure 4:
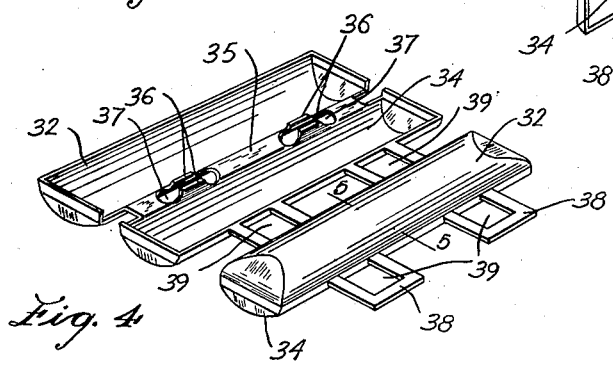
Fig. 4 is an enlarged perspective view of the links shown in Fig. 3, one of the links being completed.

The chain is assembled by positioning a stamping 32 at right angles to an adjacent stamping, see Fig. 3, the tabs of the second stamping being passed through the openings 37 of the first stamping. The two link sections of the first stamping are then bent or turned to join into a completed link, see Fig. 4, whereupon each pair of spaced finger lugs turn so as to enter into the corresponding openings 39. Since the connector bar is of relatively narrow width, the edges and ends of the two link sections contact to close the link, and the spaced finger lugs of each pair, which are swung by the turning movement of the link sections, engage or are preferably caused to overlap within the openings 39, see Fig. 5, to make an extremely strong connection. The extent of overlapping is readily varied by changing the width of the connecting bar; the parts may be proportioned so that there is no overlapping, but merely a butt joining, but this arrangement does not provide as strong a pull resistance as is attained by overlapping. The connecting parts are all concealed, as the joining of the two link sections effectively encloses the locked finger lugs.

The resultant chain, as shown in Fig. 1, comprises a series of tubular hollow link sections which may be ornamented as desired, connected by connecting tabs, the actual connection being completely concealed from view, the chain being extremely strong and flexible and capable of withstanding hard pulls.

Figure 6:
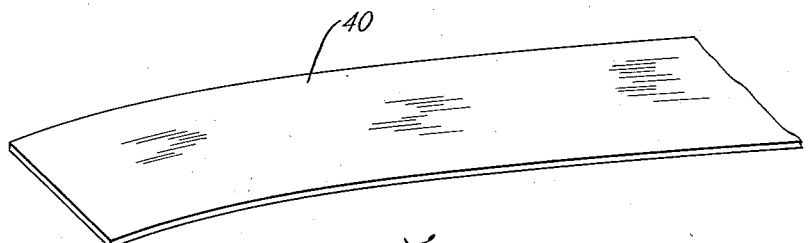
Fig. 6 is a perspective view of a metallic blank operated on by the die of the present invention.
Figure 7:
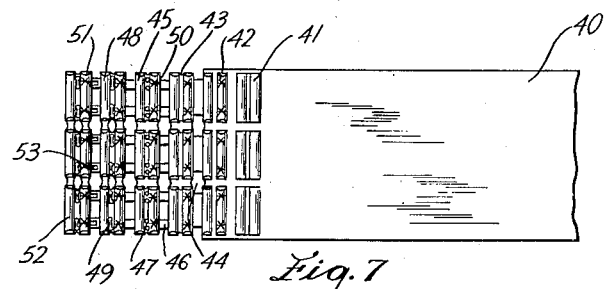
Fig. 7 is a plan view of the blank after stamping and before assembly.

The die of the present invention is designed to operate upon a continuous row of sheet stock 40 such as illustrated in Fig. 6, the sheet 40 being preferably of sufficient width to make a plurality of widths of chains of the type shown in Fig. 1. Referring now to Fig. 7, the sheet stock 40 is fed into the die in an intermittent movement and the first operation stamps out adjacent pairs of semi-circular sections 41. The next operation sharply defines the contours of the portions 41 and stamps a design on the exterior of the dished-out portion, as at 42. Further movement of the blank through the die produces the results shown at 43, wherein the surplus material on the upper and lower edges is removed and the connecting tabs are sharply defined by openings 44 stamped out of the material. The next operation on the blank, indicated at 45, cuts away all the material about the extending tab portions 46, and openings 47 are formed between adjacent pairs of semi-circular sections. Another stamping operation changes the blank as indicated at 48, lugs 49 being struck up from between the openings 47 formed in the previous operation, and the portions 50 between the connected rows of chain being opened as at 51. The final stamping operation on the blank, as indicated at 52, stamps openings 53 in the connecting tabs 46. In this final stamping operation, if it be desired to form three chains instead of one chain with three sections as shown in Fig. 7, the connecting tabs are severed by means of suitable cutters.

Figure 8:
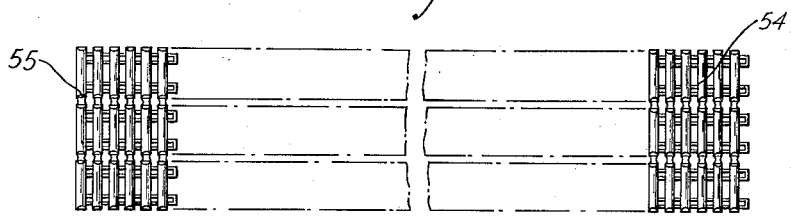
Fig. 8 is a plan view of a modified form of chain manufactured by the die of the present invention.
Figure 9:
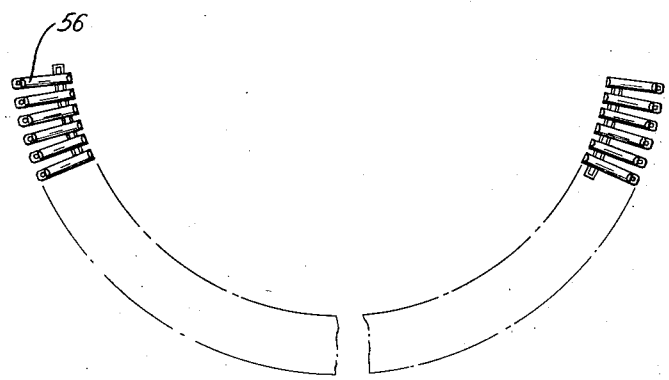
Fig. 9 is another modified form of chain made by the die of the present invention.

The resultant chain is illustrated as of triplicate width as shown at 54 in Fig. 8, and comprises three separate chains 55 of the type shown in Fig. 1. Other variations may be readily made, such as the chain 56 shown in Fig. 9, wherein one of the connecting tab portions 46 is eliminated to leave the individual hollow links connected by only one tab. This construction gives the chain endwise flexibility for shaping into necklace form as shown in Fig. 9.

Figure 10:
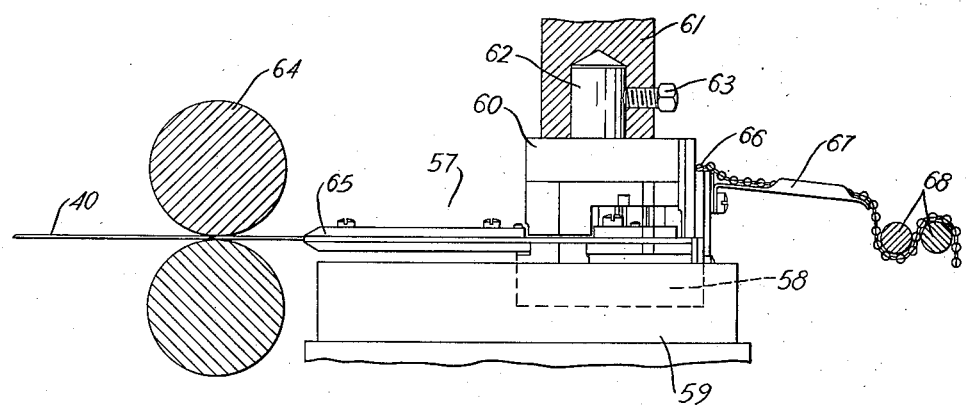
Fig. 10 is a side elevation of the die in position in a stamping press.

Referring now to Fig. 10, the die 57 is mounted in a conventional power press, the lower portion 58 being fixed in the bed 59, and the upper portion of the die 60 being set in the ram 61 by means of the shank 62 and set screws 63. The blank 40 is fed into the die from a spool or reel (not shown) by means of conventional feed rolls 64, into a guide 65 attached to the lower portion 58 of the die. After the blank has passed through the die and the various operations shown in Fig. 7 are completed, the finished chain emerges at 66, a guide shelf 67 being bolted to the upper portion of the die to direct the chain away from the die. The chain is preferably passed between closely adjacent rollers 68 to ensure complete separation of all the stamped parts, and freedom of hinging action between adjacent links.

Figure 17:
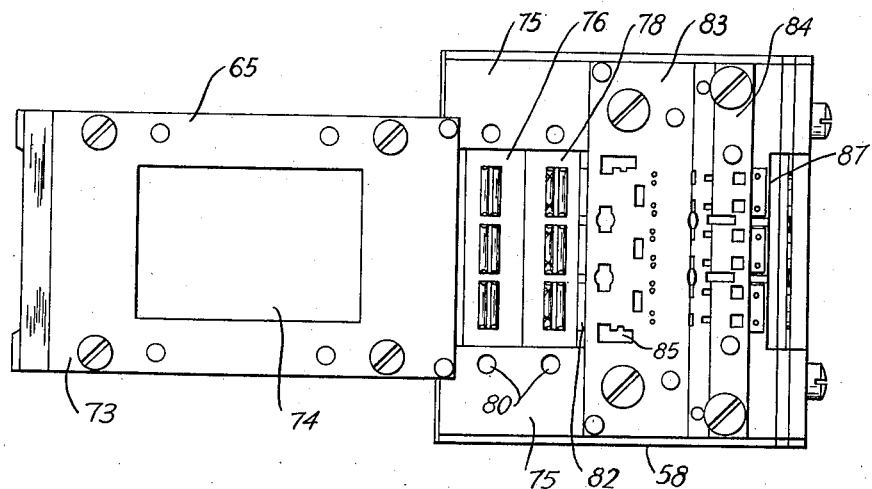
Fig. 17 is a top plan view of the lower portion of the die.
Figure 18:
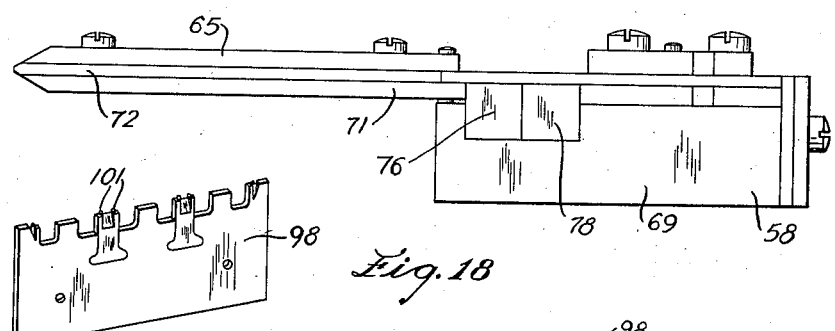
Fig. 18 is a side elevation of the lower portion of the die.

The working parts of the die are set in steel bases, the lower die part in base 69 and the upper die part in base 70. The guide 65 which initially receives the blank 40 comprises a solid rectangular plate 71, see Figs. 17 and 18, sidestrips 72, and an upper plate 73 having a central rectangular opening 74 and separated from the lower plate 71 by the strip 72 to form a guide passageway through which the blank is fed. As shown in Figs. 17 and 18, the guide plate 65 is bolted to the rear portion of the bottom die base 69.

As the blank 40 enters the lower die portion 58, it is guided by the lower die plate 75 onto the die section 76. The complementary upper die portion, see Fig. 12, is provided with a section 77 which cooperates with the section 76 to perform the stamping 41 on the blank 40, as shown in Fig. 7. The blank then moves forward to the next lower die element 78 (Fig. 17) and its complementary die element 79 in the upper portion, as shown in Fig. 14, which produce the stamping 42, the previously formed stamped-out portions being more sharply defined and a suitable design being impressed on the link surface.

Spaced openings 80 are provided at opposite sides of the die portion 76 and 78 in the guide plate 75, into which pins 81 of the upper die element slide so as to insure proper centering of the upper die element when it descends upon the lower die element.

Referring now to Fig. 17, the blank progresses over a grooved portion 82 which serves as a guide, and beneath the plate 83 which straddles the upper and lower guide plates 75. Spaced from the plate 83 is another plate 84, the plates 83 and 84 being provided with suitable cut-out portions and openings 85 to permit passage of the die punches 86 in the upper die portion. The successive rows of die punches 86 are designed to form the successive stampings shown in Fig. 7 and heretofore described, in the conventional manner, the punches 86 being guided into their respective openings and slots 85 by the centering guide pins 81 and the aligned openings 80. The plates 83 and 84 further serve to support the punches 86 and prevent breaking or bending, as these punches are of very small cross-section.

Figure 11:
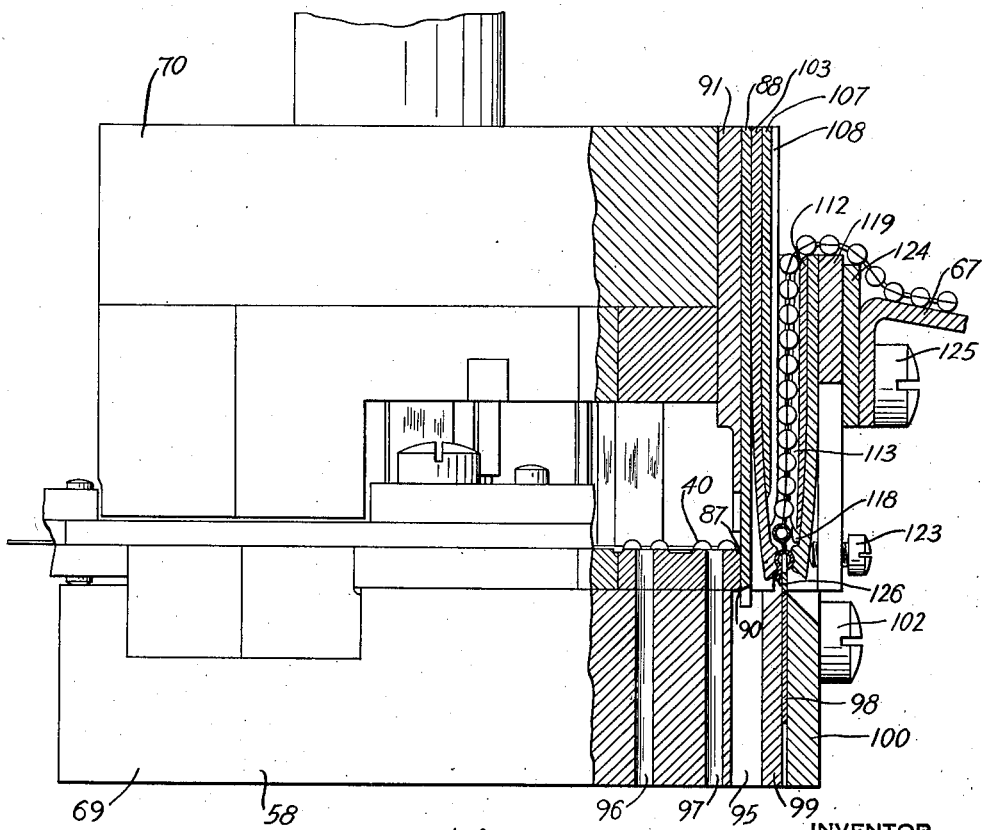
Fig. 11 is an enlarged side elevation of the die, parts being broken away to show the chain forming features.

The assembly structure is disclosed in Fig. 11, and is mounted on the front of the upper and lower die elements. After completion of the stampings shown in Fig. 7, further movement of the blank 40 pushes the outermost finished link sections beyond the edge 87 of the lower die block. The link is then sheared off by the cutting element 88, which, see Fig. 15, comprises a rectangular plate having cut-out portions 89 on the lower edge thereof, the inner edge of the cut-out portions 90 being bevelled to provide a cutting edge. The cutting plate 88 is held to the front of the block 70 by a holding plate 91 shown in Fig. 16, which has a central recess 92 into which the cutting plate will fit flush with the surface of the holding plate, the lower portion thereof being cut out as at 93 to expose the cutting surface of the plate 88. The plate 88 is held in the holding plate 91 and both plates are held in the block 70, by means of the centering pins 94 and screws 94a. The lower block 58 is provided with an opening 95 which gives clearance to the cutting blade and permits any loose metal particles to fall out of the die. Other suitable openings, such as 96 and 97, are also provided beneath the punching die portion to permit removal of loose metal particles from the die.

The front part of the lower die section is provided with a blade 98, Fig. 20, which is held between plates 99 and 100, shown in Figs. 21 and 22. The upper edge of the blade 98 is cut out, and is provided with spaced pins 101, and the blade 98 and plates 99 and 100 are bolted to the front of the lower die portion as by the bolt 102 shown in Fig. 11. As each link is cut from the blank by the cutting blade 88, it is pushed forwardly until it straddles the blade 98, the pins 101 entering the openings 37 in the link to hold it in operative position during the punch stroke of the upper die element.

The link is formed and turned as described in connection with Figs. 1 to 5 inclusive, by the assembly structure bolted to the front of the upper die block 70. This includes a spring element 103, see Fig. 24, which has slots 104, thus forming three spring tongues 103a. The lower end of the spring 103 is turned inwardly and has a thickened portion 105 at its lower edge which is provided with an arcuate groove 106 on its inner face. Bolted to the inner face of the spring plate 103 is the guide plate 107 shown in Figs. 23 and 23a, which is provided with a recessed portion separated into three guide passages by ribs 108, adapted to guide the three sections of the chain.

Bolted to the face of the plate 107 is a second guide plate 109 which also has a central guide portion 110 and spaced guide ribs 111, the bottom of each section defined by the ribs 111 being provided with an opening 112 as shown in Figs. 25 and 25a. The oppositely disposed plates 107 and 109 form a chain passageway 113 therebetween, see Fig. 11, the passageway 113 being divided into three compartments by the ribs 108 and 111. Furthermore, the lower ends of the rib 108 on the plate 107 are tapered so that the guide passageways formed thereby are of less depth at the lower end and increase in depth as the chain moves upwardly in the passageway 113.

On the outside of the plate 109 is a second spring member 114, shown in Fig. 26, which is similar to the spring member 103 shown in Fig. 24. This is also divided into three spring tongue sections by the slots 115, and the lower edge thereof is thickened as at 116 and is provided with an arcuate groove portion 117 which is complementary to the groove portion 106 in the spring tongue 103. Each spring portion of the plate 114 adjacent the thickened end 116 is provided with a dowel pin 118 which extends through the cut-out openings 112 in the plate 109. The spring tongue 114 has a spring plate 119, Fig. 27, mounted thereon, which is slotted as at 120 to form three spring sections adapted to extend behind the sections of the spring tongue 114. Each spring section 121 is provided adjacent its lower edge with spaced threaded openings 122 which carry adjustable set screws 123 for regulating the tension of the spring tongue. The spring assembly carries a support plate 124 for the shelf 67, and the entire structure is bolted to the upper die block by means of a holding bolt 125. As shown in Figs. 10 and 11, the shelf 67 is locked between the bolt 125 and the plate 124.

As the upper die portion descends, the arcuate grooves 106 and 117 at the bottom of the spring plates 103 and 114 turn a link section 126 over the top edge of the blade 98 into the position shown in Fig. 11. The die descends sufficiently so that the link is held between the arcuate portions 106 and 117 by the tension of the spring tongue, it being noted that just prior to the turning movement the cutting edge 90 in the blade 88 had sheared off the link section from the blank 40. As the die ascends, another link section is pushed over the edge of the blade 98. The ascending movement of the upper die portion carries the link section 126 with it, and as soon as the spring tongues 103 and 114 have pulled the link section 126 from the top edge of the blade 98, the tension of the spring tongues completes the closure of the link. The link 126 is then held, completely closed, between the arcuate grooved portions 106 and 117 with the extended tabs pointing downwardly. As the upper die comes down the extended tabs of the held link section enter the slots in the next link section, and further movement of the die forces the arcuate portions 106 and 117 away from the link 126 and down upon the next link, the link 126 being pushed upwardly, and also laterally by the pins 118, and between the upper grooved partitioned portions of the spring tongues. At the same time, utilizing the locking action of the tab and link sections as described in connection with Figs. 1 to 5 inclusive, the link 126 has been connected to the next link. Each time the die descends a link is thus pushed from between the grooved portions 106 and 117 and a new link is forced therebetween. As the chain is pushed from and leaves the passageway 113 it is cleared from the die section by the shelf portion 67 and is run between the rollers 68 to free adjacent links.

It is thus evident that the die of the present invention is simple in construction and easy and economical to manufacture and assemble. The parts are put together so that they are readily replaceable, and the number of links, the size of the links, and the design of the final chain may be readily varied without remaking the die by changing the punches 86 in the upper die element and by forming plates 83 and 84 with sufficient openings to compensate for all variations. As heretofore described, the entire machine is compact and simple in construction and the operation is continuous from the blank to the finished chain, the blank being fed to the die and put through the various stampings heretofore described in connection with Fig. 7 and then assembled into the final chain, in a single compact machine.

While I have described specific constructional embodiments of my invention, it is obvious that changes in the shape and size of the parts, and their relative arrangement, and in the order and sequence of their operation, may be made to suit the requirements for different chain designs, without departing from the spirit and the scope of the invention as defined in the appended claims.

I claim:

1. In a chain making apparatus, means for stamping successive sets of link portions, each set being adapted to be joined to form a complete link, one portion of each set having a hinge tab provided with an opening, and another portion of each set having hinge fingers, means for successively severing said sets, means for hinging the severed set to the contiguous set stamping by joining said hinge fingers through the hinge tab opening thereof, and means for joining the severed set to form a complete link, whereby a chain of hinged links is formed.

2. In a chain making apparatus, means for stamping successive sets of two integrally connected half link portions, each set being adapted to be joined to form a complete link, one portion of each set having a hinge tab provided with an opening, and another portion of each set having hinge fingers, means for successively severing said sets, means for hinging the severed set to the contiguous set stamping by joining said hinge fingers through the hinge tab opening thereof, and means for joining the severed set to form a complete link, whereby a chain of hinged links is formed.

3. In a chain making apparatus, means for stamping successive sets of link portions, each set being adapted to be joined to form a complete link, each set having a hinge tab extending therefrom and provided with an opening, and having spaced hinge fingers protruded between the portions thereof, means for successively severing said sets, means for hinging the severed set to the contiguous set stamping by joining said hinge fingers through the hinge tab opening thereof, and means for joining the severed set to form a complete link, whereby a chain of hinged links is formed.

4. In a chain making apparatus, means for stamping successive sets of two integrally connected half link portions, each set being adapted to be joined to form a complete link, each set having a hinge tab extending therefrom and provided with an opening, and having spaced hinge fingers protruded between the portions thereof, means for successively severing said sets, means for hinging the severed set to the contiguous set stamping by joining said hinge fingers through the hinge tab opening thereof, and means for joining the severed set to form a complete link, whereby a chain of hinged links is formed.

5. In a chain making apparatus, means for stamping successive sets of integrally connected link portions, each set comprising similar half-link portions adapted to be folded together to form a cylindrical link and having complementary hinge connection portions, means for successively severing said sets, means for connecting the complementary hinge connection portions of each severed set and the contiguous set, and means for folding the connected half-link portions to form a complete cylindrical link, whereby a chain of hinged cylindrical links is formed.

6. In a chain making apparatus, means for stamping successive sets of integrally connected link portions, each set comprising semi-cylindrical half-link portions adapted to be folded together to form a cylindrical link, one portion of each set having spaced finger lugs and another portion having spaced hinge tabs, means for successively severing said sets, means for connecting the hinge tabs of each severed set with the finger lugs of the contiguous set, and means for folding the connected half-link portions to form a complete cylindrical link, whereby a chain of hinged cylindrical links is formed.

7. In a chain making apparatus, means for stamping successive sets of integrally connected link portions, each set comprising similar half-link portions adapted to be folded together to form a cylindrical link and having complementary hinge connection portions, means for successively severing said sets, means for connecting the complementary hinge connection portions of each severed set and the contiguous set, means for folding the connected half-link portions to form a complete cylindrical link, whereby a chain of hinged cylindrical links is formed, and means for swinging said chain links to ensure free hinge action between said chain links.

8. In a chain making apparatus, a lower die block, a complementary upper die block, complementary die means on said blocks for progressively stamping successive sets of integrally connected link portions, each set comprising similar half-link portions adapted to be folded together to form a cylindrical link and having complementary hinge connection portions, a cutting edge on said upper die block for successively severing said sets, and means including spaced spring plates on said upper die block for connecting the complementary hinge portions of each severed set and the contiguous set and for folding the connected half-link portions to form a complete cylindrical link.

9. In a chain making apparatus, a lower die block, a complementary upper die block, complementary die means on said blocks for progressively stamping successive sets of integrally connected link portions, each set comprising similar half-link portions adapted to be folded together to form a cylindrical link and having complementary hinge connection portions, a cutting plate bolted to one end of said upper die block for successively severing said sets, spaced complementary plates having spaced spring edges and bolted to said cutting plate, and a complementary holding plate bolted to said lower die element, said spring edges being adapted to straddle said holding plate when said dies are closed, said spring plates and holding plates being adapted to connect the complementary hinge portions of each severed set and the contiguous set and to fold the connected half-link portions to form a complete cylindrical link.

WILLIAM F. HESS.